May 24, 1938.  H. A. BERGERT  2,118,756
APPARATUS FOR USE IN EFFECTING ADJUSTMENTS OF ROLLER BEARING PARTS
Filed March 29, 1937
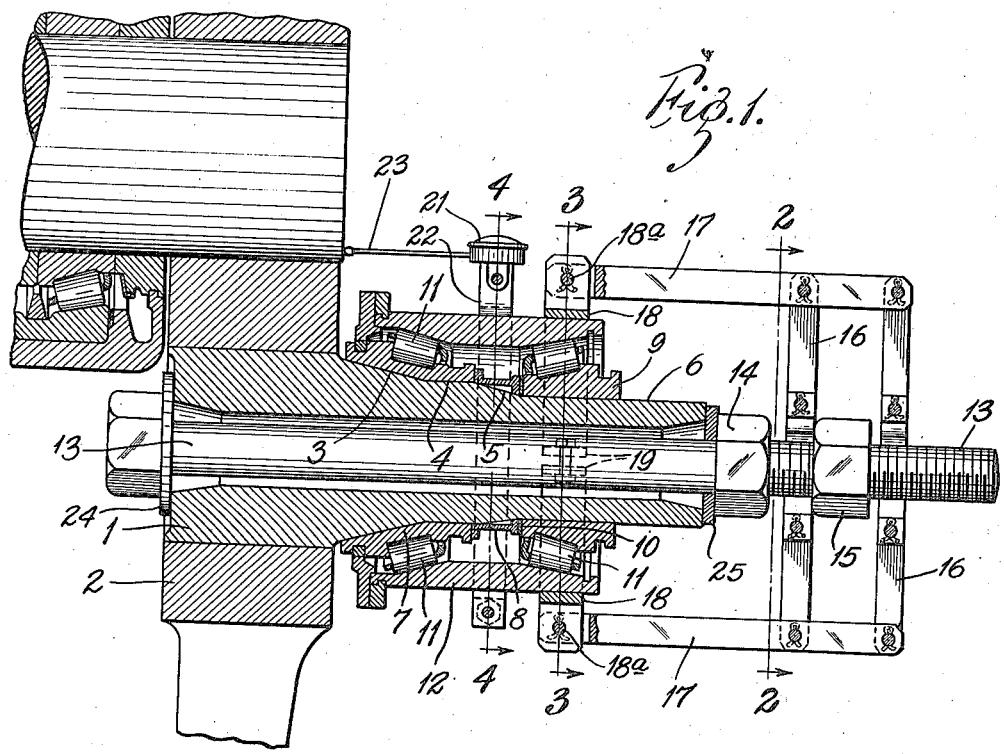
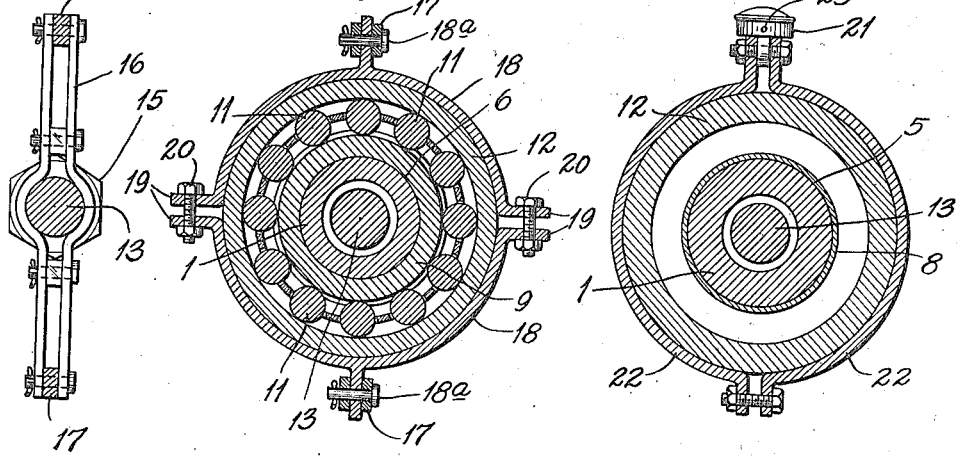
INVENTOR
HIS ATTORNEYS.

Patented May 24, 1938

2,118,756

UNITED STATES PATENT OFFICE 2,118,756

APPARATUS FOR USE IN EFFECTING ADJUSTMENTS OF ROLLER BEARING PARTS

Henry A. Bergert, Canton, Ohio, assignor to The Timken Roller Bearing Company, Canton, Ohio, a corporation of Ohio Application March 29, 1937, Serial No. 133,528

5 Claims. (Cl. 254—100)

There are divers constructions wherein the cones or inner raceway members of roller bearings are mounted with a press fit on crank pins, shafts or the like which have an axial bore and frequently two bearing cones tapering in opposite directions are used with a single outer bearing member having two raceways corresponding to the raceways of the two cones. On account of the tightness of the fit of the bearing cones on the pin and the need for accuracy in positioning the bearing cups or outer raceway members with relation to the two cones, it has heretofore been difficult to obtain and maintain a correct adjustment. The object of the present invention is to minimize such difficulty. The invention consists in apparatus hereinafter described whereby the correct relative position of the parts may be ascertained and provided for. It also consists in the construction and in the combination of parts hereinafter described and claimed.

In the accompanying drawing,

Fig. 1 is a view of my apparatus applied to a locomotive crank shaft pin and the roller bearing therefor, such pin and bearing being shown in longitudinal section;

Fig. 2 is a transverse section on the line 2—2 in Fig. 1;

Fig. 3 is a transverse section on the line 3—3 in Fig. 1; and

Fig. 4 is a transverse section on the line 4—4 in Fig. 1.

The crank pin 1 illustrated in the drawing has an axial bore. The pin is of larger diameter at one end than at the other, the large end being mounted in a locomotive wheel 2. The portion 3 of the pin next to the locomotive wheel tapers therefrom and next to its smaller end is a cylindrical portion 4, next to which, in turn, is another tapering portion 5, next to which is a substantially cylindrical or very slightly tapering portion 6 that reaches to the end of the pin.

The roller bearing illustrated comprises an annular inner raceway member or cone 7 whose inner surface is partially conical and partially cylindrical and of proper dimensions to fit tight on the inner conical surface 3 of the pin and on the cylindrical portion 4 adjacent thereto. Next to said inner bearing cone is a spacing ring or sleeve 8 surrounding the outer conical portion 5 of the pin. On the outer cylindrical portion 6 of the pin is a second bearing cone 9, between which and the spacer 8 there may be one or more annular shims 10. The conical raceways of the bearing cones taper toward each other and each is provided with a circular series of taper rollers 11. Surrounding the rollers is the cup or outer bearing member 12 with its two raceways corresponding to the respective series of rollers.

My apparatus comprises a heavy bolt 13 of sufficient length to extend through and beyond the crank pin. This bolt is provided with two nuts 14, 15. Mounted loose on the bolt is a frame or rig which comprises two beams or cross pieces 16 with an opening for the bolt to extend through, the two beams being spaced apart somewhat more than the length of the outer nut 15 and said nut being between them. On the outer ends of the cross beams 16 are longitudinally extending bars or rods 17 which are substantially parallel with the axis of the bolt. On the free end of each of these bars is secured, as by pins 18a, a semi-circular member 18 whose inner surface has the same radius of curvature as the outside surface of the bearing cup. The two semi-circular members are mounted midway of their length and have outwardly extending flanges 19 at their ends, said flanges being perforated to receive clamping bolts 20, by which said members may be clamped tight around the bearing cup. A dial gage 21 provided with a clamping band 22 is mounted on said cup, with its feeler or contact rod 23 parallel with the axis of the cup.

The operation of the construction hereinbefore described is as follows: After the inner bearing cone 7 is properly mounted, a suitable spacer sleeve 8 together with a number of shims 10 are placed on the crank pin and then the outer bearing cone 5 is placed on said pin. A washer 24 is slipped over the bolt which is then passed through the bore of the crank pin, whereupon another washer 25 is slipped over the end of the bolt and the inner nut 14 is placed thereon and turned until the bolt is clamped firmly on said pin. The inner cross beam 16 of the rig or frame is then slipped over the end of the bolt and the outer nut 15 is then placed on the bolt and, as it turns, the nut 15 will press the inner cross beam forward and the outer cross beam will follow over the end of the bolt. The two halves 18 of the clamping band are then bolted together to firmly clamp said band on the bearing cup 12.

In this position of the parts, the movement of the outer nut 15 endwise of the bolt presses the frame backward or forward, as the case may be, carrying the bearing cup 12 with it. When the bearing cup is moved outwardly as far as the outer series of rollers will permit, the dial gage is clamped on said cup with its contact rod in contact with the wheel or other part which is fixed with relation to the crank pin. The setting of the gage in this position (which is preferably zero on the gage) is then noted, whereupon the outer nut 15 on the bolt is turned forwards to move the rig together with the bearing cup endwise until the rollers at the inner end of said cup are brought into proper operative relation to their inner and outer raceways. While the parts are in this position, the reading of the gage (directly in case the original setting is zero, or by difference if the original setting was not zero) shows the looseness or endwise play of the cup and the total thickness of shims that should be removed to take up the excess play. Thereupon the apparatus is removed. The outer bearing cone is then removed or backed far enough to permit removal of shims. Then shims of a total thickness equal to such excess are removed from the crank pin and the outer bearing cone is then placed back on said pin and pressed home. When split shims are used, they are removable without removing the outer bearing cone.

While the apparatus hereinbefore described is especially valuable in connection with the mounting of locomotive crank pin bearings of the kind illustrated, it is applicable to the mounting of other types of bearings, especially bearings where the fitting pressure is heavy and it is difficult and very undersirable to shift the bearing cone back and forth on the crank pin or like part.

What I claim is:

1. A headed and threaded through bolt adapted to extend through the bore of a crank pin or the like, a washer thereon adapted to bear against the end of said pin, a nut on said bolt adapted to press said washer against the end of said pin, cross beams having openings through which said bolt extends, a second nut on said bolt between said beams adapted to bear against said beams selectively, a clamping ring having means whereby it may be clamped to an outer raceway member and means for connecting said ring to said beams to move therewith.

2. A rigging set for use in manipulating the roller bearings of bored locomotive crank pins and the like, said set comprising a headed and threaded bolt adapted to extend through such crank pin, interchangeable pushing and pulling means slidable on said bolt and adapted for actuating a bearing member on said pin and threaded means working on said bolt and arranged to actuate the pushing and pulling means selectively.

3. An apparatus for moving an outer raceway member within its limits of play comprising a headed and threaded through bolt adapted to extend through the bore of a crank pin, means for securing said bolt to said pin, cross pieces carried by said bolt in spaced apart relation, a nut on said bolt in between said cross pieces, adapted to bear against said cross pieces selectively, a clamping ring having means whereby it may be clamped to an outer raceway member, and means for connecting said ring to said cross pieces whereby said ring may be actuated by said nut.

4. An apparatus for moving an outer raceway member within its limits of play comprising a headed and threaded through-bolt adapted to extend through the bore of a crank pin, a nut on said bolt adapted to bear against the end of said pin and thereby clamp said bolt on said pin, a rig slidable endwise of said bolt and having a clamping device adapted to grip an outer raceway member, and a second nut on said bolt arranged to move said rig backwards and forwards selectively.

5. An apparatus for moving an outer raceway member within its limits of play comprising a headed and threaded through-bolt adapted to extend through the bore of a crank pin, a washer on said bolt, a nut on said bolt adapted to bear said washer against the end of said pin and thereby clamp said bolt on said pin, a rig slidable endwise of said bolt and having a clamping device adapted to grip an outer raceway member, and a second nut on said bolt arranged to move said rig backwards and forwards selectively.

HENRY A. BERGERT.